Sept. 13, 1949.   H. H. CONACHER   2,481,572
MOTOR CONTROL SYSTEM
Filed Oct. 13, 1945   2 Sheets-Sheet 1
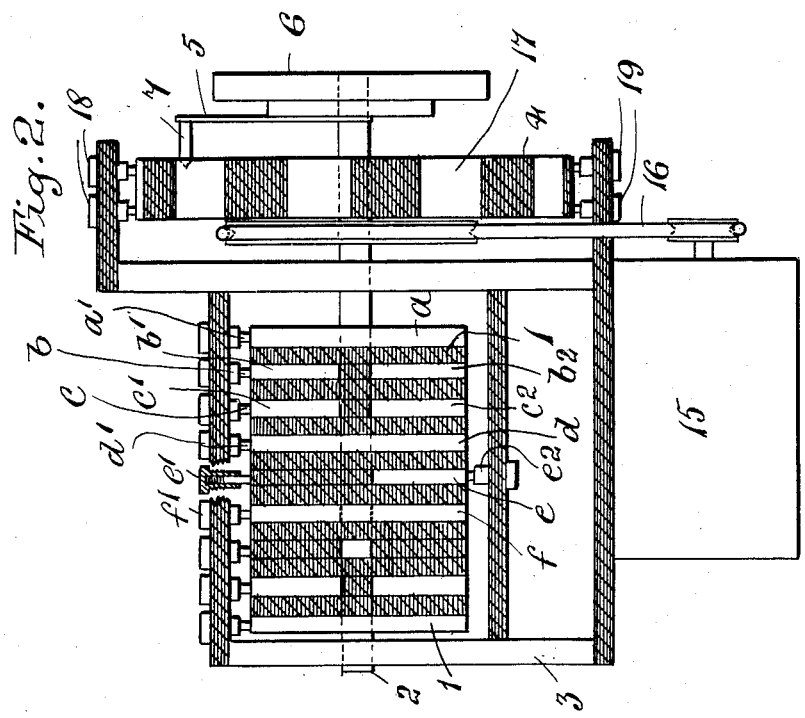
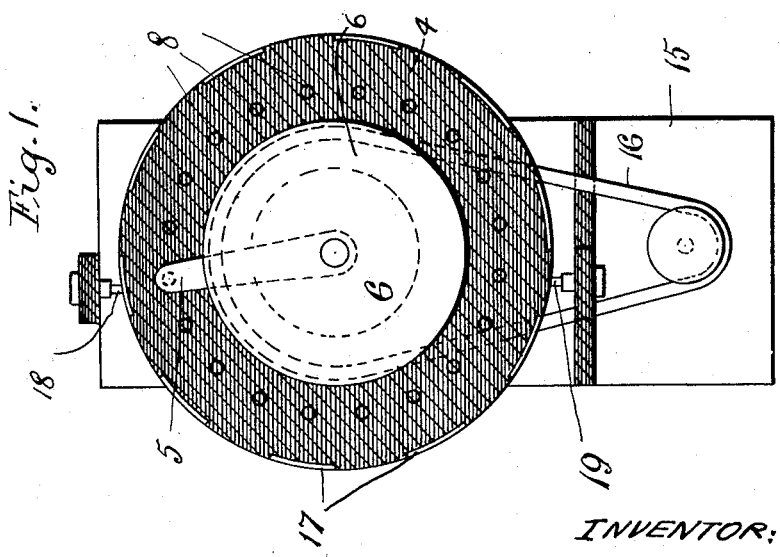
INVENTOR:
HUGH HALL CONACHER
BY [signature]

Sept. 13, 1949. H. H. CONACHER 2,481,572
MOTOR CONTROL SYSTEM
Filed Oct. 13, 1945 2 Sheets-Sheet 2
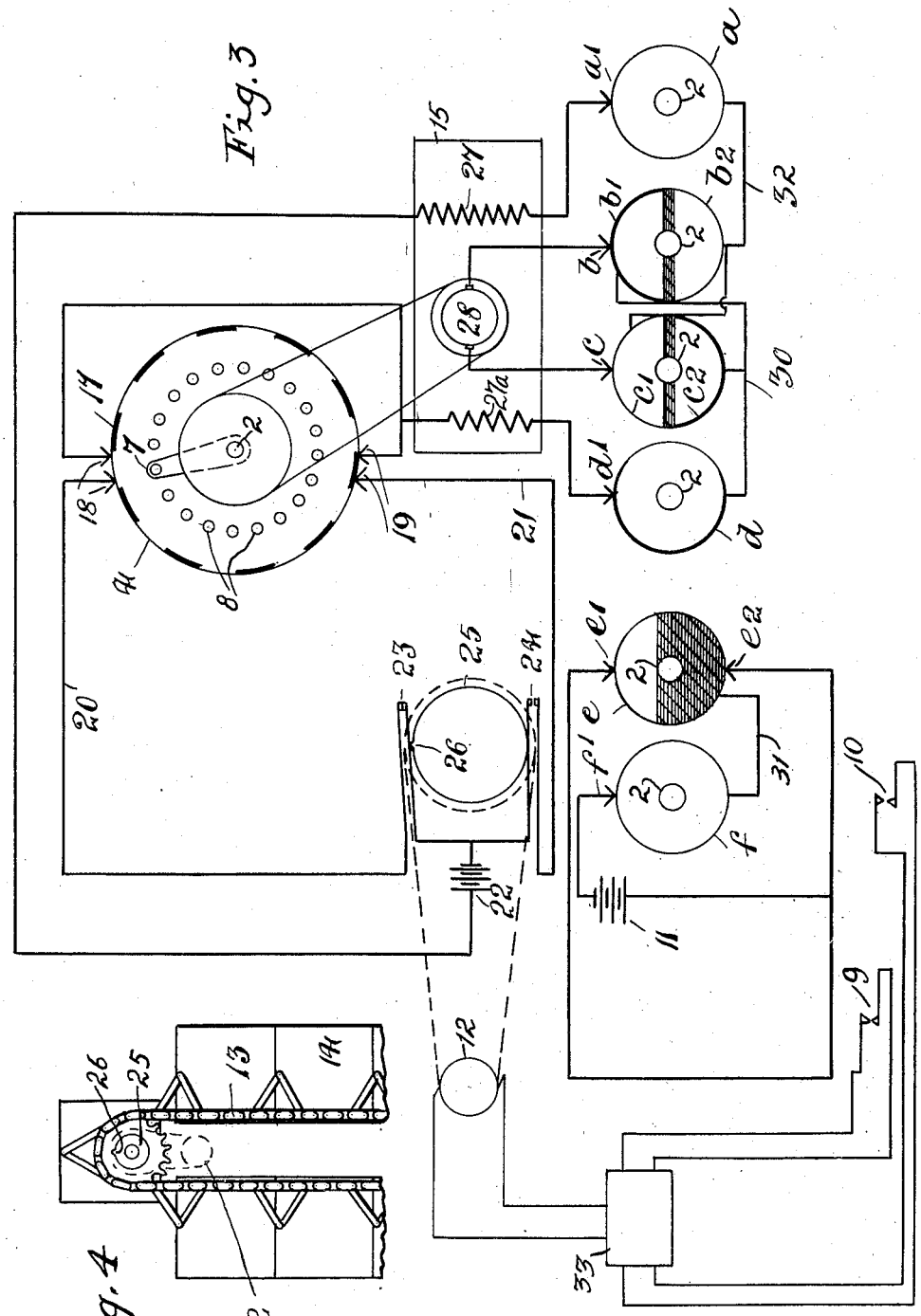
INVENTOR:
HUGH HALL CONACHER Patented Sept. 13, 1949

2,481,572

UNITED STATES PATENT OFFICE 2,481,572

MOTOR CONTROL SYSTEM

Hugh Hall Conacher, Spring Hill, Birmingham, England, assignor to Messrs. Waldall & Assembly Limited, Birmingham, England Application October 13, 1945, Serial No. 622,121
In Great Britain November 4, 1944

10 Claims. (Cl. 318—162)

This invention relates to motor driven rotary members and a control system therefor, particularly applicable to power driven storage conveyors of the type in which containers or holders for articles are mounted on endless chains or bands. The invention has as one of its important objects the provision of means to bring any particular container or holder over the shortest path into a convenient position for loading or unloading or for giving convenient access to such containers or holders.

The invention contemplates also means for automatically cutting off the power effecting a number of operations or steps in an operation with respect to any selected location of such holders. Another object of this invention is to provide means for controlling the movement of a conveyor system to bring any particular conveyor and/or its containers into a predetermined position for loading or unloading.

Referring to the drawings there is disclosed in:

Figure 1 is a front elevation of a drum switch embodying features of this invention.

Figure 2 is a side elevation of the drum switch of Figure 1.

Figure 3 is a wiring diagram illustrating the main electric motor control circuit and the switch motor driving circuit, and Figure 4 is a fragmentary view of a conveyor.

In the particular embodiment described the motor driven rotary member comprises a chain driven conveyor 13 which carries containers 14 for storing motor cars. The conveyor is thus capable of being moved to bring any container 14 to a loading and unloading position, the conveyor being driven by the main motor 12. If the motor 12 is reversible, such container can be moved over the shortest path to the unloading point. A rotatably mounted switch drum 1 is provided to actuate the control system for stopping and starting motor 12, such switch drum automatically shutting off the current at a predetermined position of rotation and stopping the motor with a container on the conveyor at a predetermined position. The switch drum 1 is set with respect to its switch-off position by means of an arm 5 and an indicating member or disc 4 so that the conveyor will stop when any particular conveyor container has been moved to a predetermined or loading point. The switch drum with its indicating member is driven in unison with the conveyor so that the positions of recesses 8 in said indicator 4, in which the arm 5 is engaged, always indicate the positions of the containers.

According to a convenient embodiment of this invention, the rotatably mounted circuit making and breaking device comprises a drum 1 made of insulating material and mounted on a spindle 2 which is journalled in a frame 3. The indicator member or disc 4 made of insulating material is freely mounted on the spindle 2 and is disconnectably coupled with said spindle by means of a spring arm 5 carried by a finger piece or knob 6 fixed on the spindle 2, the spring arm carrying a pin 7 which is adapted to spring lock into any one of the aforesaid recesses 8 provided in the face of indicator disc 4. The drum 1 has a slip ring $f$ which passes entirely around the drum and is internally connected as indicated by wire or line 31 (Fig. 3) to a slip ring $e$ passing less than half way round the drum. A spring pressed wiper contact $f1$ is in contact with the ring $f$, whilst contacts $e1$ and $e2$ are on diametrically opposite sides of the drum aligned with the half slip ring $e$ to wipe thereover. Fig. 3 for clearness of illustration shows the slip rings $f$ and $e$ side by side, although they are both fixed and arranged on the center shaft 2. The contacts $f1$, $e1$ and $e2$ are in circuit with the solenoid switches 9 and 10 (see Figure 3) in a circuit energised by a battery 11 and according to whether the contact $e1$ or $e2$ is in contact with the ring $e$, so either of the solenoid switches 9 and 10 are energised for switching on the reversing electric motor 12 either into forward or reverse. The electric motor 12 drives the conveyor 13 carrying a number of containers 14 in spaced relation and therefore the electric motor is switched off when the contacts $e1$ and $e2$ bear on the drum insulation at each end of the ring portion $e$. Should the switch be turned to bring the ring $e$ into contact with $e1$ the solenoid switch 9 is energised to drive the motor in one direction, but should the drum 1 be turned in the reverse direction the ring $e$ contacts $e2$ and the solenoid switch 10 is energised to switch on the motor 12 in the reverse direction. The motor 12 is started in forward or reverse direction by the reversing starter switch 33. The indicator member or disc 4 has a number of recesses 8 equal to the number of containers 14 on the conveyor and is adapted to be driven in unison with the conveyor so that disc 4 performs one complete revolution with one revolution of the conveyor. The containers are numbered, and corresponding numbers are given to the recesses 8 and therefore the position of any conveyor container is indicated by the position of the correspondingly numbered recess 8, and therefore if any particular conveyor container is required to be brought to the bottom of the conveyor, the drum is turned round so that the circuit breaking position is opposite its particular corresponding recess 8 which causes switching on of the driving motor 12, which moves the conveyor 13 and drum 1 until the drum moves again to the position shown by Figure 3 to thereby switch off the motor 12. In order to avoid the need for unnecessary travel the main motor 12 is a reversing motor so that when a container on one side of the conveyor is required the motor is driven in the direction to move the container downwards and when a container on the other side is wanted the motor is driven in the reverse direction to bring the container downwards and this is automatically effected by the arrangement of the slip rings f and e and the co-acting contact blades f1, e1, and e2 as above described. The conveyor may have to be controlled from a distance and therefore the switch drum 1 is driven by an auxiliary electric motor 15 by means of a belt or chain 16 driving the indicating member 4 which is normally fixed on the shaft 2 by the pin 7 to rotate with the drum 1. The indicating member 4 is shown in Fig. 3 separate for clearness of illustration, but its assembly on the shaft 2 is shown in Fig. 2. The indicating member 4 is formed of insulating material and has a series of copper strips 17 therearound and insulated from one another, and a pair of contact pins 18 and a pair of contact pins 19 are arranged so that when one pair lies opposite a strip 17, the other pair rests on an insulation portion intermediate two contact strips. The contact pins 18 and 19 are respectively arranged in circuits 20 and 21 in parallel between the battery 22 and the windings 27 and 27a of the motor 15 as shown by Figure 3. Included in the circuits are the make and break contacts 23 and 24 which are normally open and are closed by a cam 25 carried by a sprocket shaft of the conveyor 13. As the conveyor revolves therefore the projection 26 on the cam (Fig. 4) alternatively closes the contacts 23 and 24. In the position shown by Figure 3 the contact 23 is assumed to be closed to complete the circuit 20 and the auxiliary motor 15 has driven the indicating member 4 one step to bring the contacts 18 to rest on the insulating material which causes opening of the circuit and stopping of the motor 15 and during this movement the contacts 19 are now shorted by one of the metal strips 17. As the cam 25 rotates the contacts 24 are closed and the current is passed through the circuit 21 to drive the auxiliary motor 15 until the contacts 19 lie on the insulating material between two strips 17. Thus when the conveyor motor 12 is switched on, the motor 15 intermittently rotates the indicating member and with it the drum 1. The number of strips or sections 17 are equal to half the number of containers 14 on the conveyor. The circuits 20 and 21 are connected to the armature 28 of the motor 15 through a series of slip rings on the drum 1, so arranged that the drum 1 and disc 4 are driven in reverse when the main motor 12 is driven in reverse as aforedescribed. For this purpose the slip rings d and a are continuous rings whilst two rings are each divided into two halves c1 and c2, and b1 and b2, and each half is insulated from the other half and spring pressed contact blades a1, b, c and d1 are wiped over by the rings; the spring ring d; half rings c1, c2; half rings b1, b2 and ring a are fixed in relation to the same spindle 2 and are shown spread out side by side for clearness of illustration; Fig. 2 showing all the slip rings and the disc 4 in assembly position. The ring d, half ring c2 and the half ring b1 are internally electrically connected as indicated by line 30, whilst the ring a, half ring b2 and half ring c1 are internally electrically connected, as indicated by line 32. In the position shown, the current passes from the battery 22 through field winding 27 of the reversing motor 15 through the ring a, half ring b2 and half ring c1, the armature 28 of the motor 15 and then through the half ring b1, half ring c2, ring d, field winding 27a of the motor 15 back to the battery 22. The direction of the current through the armature windings 28 will be reversed if the drum 1 is given half a turn as the current will then pass from d, c2 to the armature winding 28 back to b2 and ring a, thus reversing the direction of the motor 15. When the switch drum is turned through 90° from the position indicated by Figure 3, the contacts c and b bear on the insulation portions between rings c1, c, and b1, b2 and therefore reversal of drive of the motor 15 is obtained simultaneously with the reversal of drive of the motor 12. The drum 1 may be provided with any number of slip rings for making or breaking any other circuits controlling operations, for instance, dealing with the loading or unloading of the containers 14 so that a sequence of operations can be controlled from a single control switch. In use, the drum 1 will always stop in a predetermined position with the contacts e1, e2, c and b insulated and the motors 12 and 15 switched off. The indicating member 4 will always remain in position with the recesses 8 in the relative positions of the containers 14. If it is required to bring a particular container to the lowest position on the conveyor, the pin 7 is withdrawn and the knob 6 and with it the drum 1 turns round to engage the pin 7 in the particular recess 8 corresponding to that container. This action therefore will have brought the half slip ring e into position energising the solenoid switch 9 or 10 and thereby starting the motor 12 and the conveyor drive.

In the example illustrated twenty containers are assumed to be carried by the conveyor so that twenty recesses 8 are provided in the disc 4 and the recesses 8 and also the containers may be marked in numerical order 1 to 20. If the conveyor has been brought to rest with a container, for instance No. 3 container, at the loading point the arm 5 will be engaged in the third recess 8, and the switch drum is in position opening the circuit of the motor 12.

The respective containers 14 therefore are arranged in the same relative position to the loading point as the corresponding recesses 8 are to the shut-off position of the switch drum. If No. 10 container is to be brought to the loading point the arm 5 is engaged in the tenth recess, and the drum and conveyor will rotate until No. 10 container is at the loading point and the tenth recess is at the shut-off position of the switch and again the relative positions of the recesses 8 to the shut-off positions is the same as the relative positions of the containers to the loading point. This condition prevails whatever the direction of movement of the conveyor may be.

The cams 26 will now move to complete one of the circuits 20 or 21 and thus will drive the drum 1 through the motor 15 step by step until the drum 1 reaches the position switching off the motors 12 and 15. The cam moves half a revolution whilst a conveyor moves one step forward.

Having thus described the invention, what is claimed as new and desired to be secured by Letters Patent, is:

1. A motor driven electric switch device for a rotary member comprising a rotatably mounted circuit making and breaking switch, means co-acting with said switch for breaking an electric circuit at a predetermined position of its rotation, an indicator on the said device coupled to be driven in unison with said rotary member the movement of which is controlled by the said electric circuit, means for disconnectably coupling the said switch with said indicator for adjusting the relative angular position of same, means for rotating step by step said rotatably mounted circuit making and breaking switch, an electric motor, a device which controls the current driving said motor to pass alternately through the motor by way of two circuits which are alternately made and broken by the step by step movement of the circuit making and breaking switch, spaced contacting strips insulated from each other and disposed at intervals around said indicator, two sets of two contacts over which the said strips wipe and arranged so that whilst one set is bridged by a strip the other set is insulated by an insulating space between two strips and one side of contacts being in circuit with one of said circuits, of the switch driving electric motor and the other set being in circuit with the other of said circuits, means for controlling the switch-driving electric motor to drive forward or reverse comprising a circuit making and breaking device in the form of a drum having two slip rings entirely around the drum and two rings each divided into two halves insulated from one another, an auxiliary electric motor, the four rings wiping over contacts connected to the fields and armature windings of said auxiliary electric motor, the slip rings being interconnected so that the current passes in one direction when the half rings on one side of the drum are wiping over the contacts and reversed when the opposite half rings are wiping over the contacts.

2. A motor driven electric switch device for a rotary member comprising a rotatably mounted circuit making and breaking switch, means co-acting with said switch for breaking an electric circuit at a predetermined position of its rotation, an indicator on the said switch coupled to be driven in unison with said rotary member the movement of which is controlled by the said electric circuit, means for disconnectably coupling said device with said indicator for adjusting the relative angular position of same, means for rotating step by step the said rotatably mounted circuit making and breaking switch said motor comprising a device which controls the current driving said motor to pass alternately through the motor by way of two circuits which are alternately made and broken by the step by step movement of the circuit making and breaking switch, spaced contacting strips disposed at intervals around said indicator, two sets of two contacts over which the said strips wipe and arranged so that whilst one set is bridged by a strip the other set is insulated by an insulating space between two strips and one set of contacts being in circuit with one of said circuits of the switch driving motor and the other set being in circuit with the other of said circuits, means for controlling the switch driving motor to drive forward or reverse comprising a circuit making and breaking device in the form of a drum having two slip rings entirely around the drum and two rings each divided into two halves insulated from one another, the four rings wiping over contacts connected to the fields and armature windings of a reversing electric motor, the slip rings being interconnected so that the current passes in one direction when the half rings on one side of the drum are wiping over the contacts and reversed when the opposite half rings are wiping over the contacts, and means for controlling a conveyor driving electric motor comprising a slip ring entirely therearound, a contact wiped over by the ring, a particular slip ring on the drum and contacts on diametrically opposite sides of the drum over which the said part ring wipes so that in one position neither contacts bear on the part ring, and a solenoid switch in circuit with the first mentioned contact and one contact of the second mentioned contacts and a solenoid switch in circuit with the first mentioned contact and the other of the second mentioned contact, the solenoid switches controlling the forward and reverse drive of the electric motor driving the conveyor.

3. A control system for a motor driven rotary member comprising a main electric circuit, an auxiliary electric circuit, a rotatably mounted circuit making and breaking switch device adapted to break said main electric circuit at a predetermined position of the rotation of said switch device, an indicator adapted to be coupled with said switch device and for rotation with the latter, the movement of said indicator and said switch device being produced by flow of current in said auxiliary electric circuit, and means for disconnectably coupling said switch device with said indicator for adjusting the relative positions to each other and hence the timing of the opening of both said circuits.

4. A control system for a motor driven rotary member, as set forth in claim 3, wherein said switch device is in the form of a drum, slip rings on the circumference of said drum, fixed contacts co-acting with said slip rings for breaking the electric circuits at a predetermined position of said drum, said indicator being mounted adjacent said drum and coupled to be driven in unison therewith under the control of said rotary member driven by an electric motor controlled by the said main electric circuit, said coupling means including a spring arm connected to said drum and a recess in said indicator, whereby said drum can be angularly adjusted in relation to said indicator for operating said circuits.

5. A control system for a motor driven rotary member, as set forth in claim 3, including an auxiliary motor, means for rotating said switch device step by step by said auxiliary motor, and a control device actuated by said main motor and operating the current for said auxiliary motor to pass alternatively through said auxiliary motor by way of two circuits which are alternatively made and broken in agreement with the step by step movement of said switch device.

6. A motor driven rotary member and controls therefor comprising a rotatably mounted contact operating circuit making and breaking switch device adapted to break a main electric circuit at a predetermined position of its rotation, an indicator on the said contact making and breaking device coupled to be driven in unison with that device under the control of the motor driven member controlled by the switch device, the movement of which indicator and circuit making and breaking device is produced by the flow of current in an associated auxiliary electric circuit controlled by the motor driven rotary member, means for disconnectably coupling the said switch device with the indicating member for adjusting the relative positions of same and hence the timing of the opening of the circuit, means whereby the circuit making and breaking device is driven step by step by an auxiliary motor, and a further device which causes the current driving the auxiliary motor to pass alternatively through the motor by way of two circuits which are alternately made and broken in agreement with the step by step movement of the circuit making and breaking device which further contact making and breaking device comprises spaced contacting strips at intervals around the indicating member, two sets of two contacts over which the said strips wipe and arranged so that whilst one set is bridged by a strip the other set is insulated by an insulating space between two strips and one set of contacts being in circuit with one of said circuits of the switch-driving electric motor and the other set being in circuit with the other of said circuits.

7. A control system for a power driven rotary machine in the form of a conveyor and like transfer apparatus comprising a reversible main motor for driving said rotary machine, a main electric circuit for said main motor and including two solenoids, a rotatably mounted switch device and adapted to actuate one of the solenoids to obtain rotation of said main motor in one direction and the other solenoid to effectuate reversal of said direction of rotation, an indicator member connectable for rotation in unison with said switch device, an auxiliary motor for driving said indicator member and through it said rotary switch device, said auxiliary motor including auxiliary electric circuit means, controlling means operatively connected with said main motor for regulating rotative movement of said auxiliary motor in accordance with the direction of rotation of said main motor, and means for coupling said indicator member with said rotary switch device so as to adjust their relative positions to each other and hence the timing of operation of said main electric circuit and said auxiliary electric circuit.

8. A control system according to claim 7, wherein said controlling means is constituted by a cam driven by said main motor and switch means engageable by said cam for operating electric current passing through said auxiliary circuit means.

9. A control system according to claim 7, wherein said rotatably mounted switch device consists of a drum made of insulating material, and a plurality of contact elements mounted on said drum and connectable respectively to said main electric circuit and to said auxiliary electric circuit means, and contact blades engaging said elements, respectively, for operating said main electric circuit and said auxiliary electric circuit means.

10. A control system according to claim 7, wherein said indicator member is provided with insulating portions and with spaced apart contact pieces, and contact pin means engaging said insulating portions and said contact pieces, respectively, for operating direction of electric current flow through said suxiliary circuit means to said auxiliary motor and to drive the latter and said switch device step by step.

HUGH HALL CONACHER.

REFERENCES CITED

The following references are of record in the file of this patent:

UNITED STATES PATENTS

| Number | Name | Date |
| --- | --- | --- |
| 2,304,843 | Nordquist | Dec. 15, 1942 |